(12) United States Patent
Novitsky et al.

(10) Patent No.: US 12,371,584 B2
(45) Date of Patent: Jul. 29, 2025

(54) COATING SYSTEM

(71) Applicant: PPG Industries Ohio, Inc., Cleveland, OH (US)

(72) Inventors: Theodore Frank Novitsky, Butler, PA (US); John W. Burgman, Wexford, PA (US); Peter Alan Lukus, Sarver, PA (US)

(73) Assignee: The Pittsburgh Paints Co., Pittsburgh, PA (US)

( * ) Notice: Subject to any disclaimer, the term of this patent is extended or adjusted under 35 U.S.C. 154(b) by 404 days.

(21) Appl. No.: 17/178,544

(22) Filed: Feb. 18, 2021

(65) Prior Publication Data

US 2021/0292593 A1    Sep. 23, 2021

Related U.S. Application Data

(60) Provisional application No. 62/982,371, filed on Feb. 27, 2020.

(51) Int. Cl.
C09D 131/04 (2006.01)
C09D 133/08 (2006.01)

(52) U.S. Cl.
CPC ......... *C09D 133/08* (2013.01); *C09D 131/04* (2013.01)

(58) Field of Classification Search
CPC .................................................. C09D 133/08
See application file for complete search history.

(56) References Cited

U.S. PATENT DOCUMENTS

| | | | | |
|---|---|---|---|---|
| 6,531,537 | B2 * | 3/2003 | Friel | C08K 3/22 |
| | | | | 524/497 |
| 7,132,142 | B2 * | 11/2006 | Truog | B32B 9/00 |
| | | | | 428/40.1 |
| 2007/0181598 | A1 * | 8/2007 | Cremeans | B65D 35/22 |
| | | | | 222/94 |

OTHER PUBLICATIONS

Pigment Yellow 42 data sheet (Year: 2014).*
ROPAQUE OP-96 data sheet (Year: 2018).*

* cited by examiner

*Primary Examiner* — Ling Siu Choi
*Assistant Examiner* — Huihong Qiao
(74) *Attorney, Agent, or Firm* — Diane R. Meyers; Leech Tishman Fuscaldo & Lampl

(57) ABSTRACT

A coating system includes as separate components: (a) a first tintable base composition including: a first resin, a first liquid carrier, and a first pigment package; and (b) a second tintable base composition including: a second resin, a second liquid carrier, and optionally a second pigment package. The pigment volume concentration and/or the sheen and/or the gloss of the first tintable base composition and the second tintable base composition are substantially different. The components (a) and (b) are not mixed together.

14 Claims, 7 Drawing Sheets

COATING SYSTEM

FIELD OF THE INVENTION

The present invention relates to a coating system, a method of preparing a tintable base composition, and a method, system, and computer program product for determining a formulation.

BACKGROUND OF THE INVENTION

Architectural coatings can exhibit a variety of colors and sheens depending on the look desired by the user. In coating stores, a base system is used, and each sheen (e.g., flat, eggshell, satin, etc.) usually has several bases, such as a pastel base, midtone base, and neutral base, such that the base system includes a plurality of tintable base compositions corresponding to various base-sheen combinations. The pastel base may be used as-is for a white paint or tinted to produce very light pastel colors. The midtone base contains less titanium dioxide and is designed for deeper colors and midtones. The neutral base contains little or no titanium dioxide and is designed for deep fully pigmented colors. Several "tiers" (e.g. premium, high, medium, economy, etc.) of tintable base compositions are usually available.

To accommodate all of the colors across all of the sheens for each tier of coating, stores must typically maintain multiple bases per sheen (multiple tintable base compositions) per each tier of coating. A simplified way of obtaining a paint composition having the desired color, sheen, and/or tier would be desirable.

SUMMARY OF THE INVENTION

The present invention is directed to a coating system including as separate components: (a) a first tintable base composition including: a first resin, a first liquid carrier, and a first pigment package; and (b) a second tintable base composition including: a second resin, a second liquid carrier, and optionally a second pigment package, where the pigment volume concentration and/or the sheen and/or the gloss of the first tintable base composition and the second tintable base composition are substantially different, where the components (a) and (b) are not mixed together.

The present invention is also directed to a method of preparing a tintable base composition from a plurality of tintable base compositions, including: mixing in a mixing container a plurality of tintable base compositions including a first tintable base composition and a second tintable base composition, where the plurality of tintable base compositions are provided to the mixing container from separate component containers, where the first tintable base composition includes: a first resin, a first liquid carrier, a first pigment package, where the second tintable base composition includes: a second resin, a second liquid carrier, and optionally a second pigment package, where the pigment volume concentration and/or the sheen and/or the gloss of the first tintable base composition and the second tintable base composition are substantially different.

The present invention is also directed to a coating system, including as separate components: (a) a first tintable base composition including: a first resin, a first liquid carrier, and optionally a first hiding pigment; and (b) a second tintable base composition including: a second resin, a second liquid carrier, and optionally a second hiding pigment, where the components (a) and (b) are not mixed together, and where: (1) the first resin and the second resin are different from one another; and/or (2) the first tintable base composition includes the first hiding pigment and the second tintable base composition includes the second hiding pigment, where the first hiding pigment and the second hiding pigment are different hiding pigments; and/or (3) the first tintable base composition and the second tintable base composition include different solids content.

The present invention is also directed to a method of preparing a mid-tier tintable base composition from a plurality of tintable base compositions, including: mixing in a mixing container a plurality of tintable base compositions comprising a first tintable base composition and a second tintable base composition to form a mid-tier tintable base composition, where the plurality of tintable base compositions are provided to the mixing container from separate component containers, where the first tintable base composition includes: a first resin, a first liquid carrier, and optionally a first hiding pigment, where the second tintable base composition comprises: a second resin, a second liquid carrier, and optionally a second hiding pigment, and where: (1) the first resin and the second resin are different from one another; and/or (2) the first tintable base composition includes the first hiding pigment and the second tintable base composition comprises the second hiding pigment, where the first hiding pigment and the second hiding pigment are different hiding pigments; and/or (3) the first tintable base composition and the second tintable base composition include different solids content.

The present invention is also directed to a computer-implemented method for determining a formulation for a coating composition, including: receiving, with a processor, a desired property associated with a desired output coating composition; and generating, with a processor and based on historical blend data, a formulation for preparing the desired output coating composition having the desired property, where the historical blend data includes data associated with blending a plurality of tintable base compositions, where the plurality of tintable base compositions includes a first tintable base composition including a first resin, a first liquid carrier, and a first pigment package, and a second tintable base composition including a second resin, a second liquid carrier, and optionally a second pigment package.

The present invention is also directed to a system for determining a coating composition formulation, including a processor programmed or configured to: receive a desired property associated with a desired output coating composition; and generate, based on historical blend data, a formulation for preparing the desired output coating composition having the desired property, where the historical blend data includes data associated with blending a plurality of tintable base compositions, where the plurality of tintable base compositions includes a first tintable base composition including a first resin, a first liquid carrier, and a first pigment package, and a second tintable base composition including a second resin, a second liquid carrier, and optionally a second pigment package.

The present invention is also directed to a computer program product for determining a coating composition formulation, including a non-transitory computer-readable medium including program instructions that, when executed by a processor, cause the processor to: receive a desired property associated with a desired output coating composition; and generate, based on historical blend data, a formulation for preparing the desired output coating composition having the desired property, where the historical blend data includes data associated with blending a plurality of tintable base compositions, where the plurality of tintable base compositions includes a first tintable base composition including a first resin, a first liquid carrier, and a first pigment package, and a second tintable base composition including a second resin, a second liquid carrier, and optionally a second pigment package.

The present invention is also directed to a coating system, including as separate components: (a) a first tintable base composition including: a first resin, a first liquid carrier, and a first pigment package; and (b) a second tintable base composition including: a second resin, a second liquid carrier, and optionally a second pigment package, where the first pigment package includes a hiding pigment, where the hiding pigment includes less than 20 weight percent of the first tintable base composition based on total solids of the first tintable base composition, where the components (a) and (b) are not mixed together.

The present invention is also directed to a method of preparing a tintable base composition from a plurality of tintable base compositions, including: mixing in a mixing container a plurality of tintable base compositions including a first tintable base composition and a second tintable base composition to form a resulting tintable base composition, wherein the plurality of tintable base compositions are provided to the mixing container from separate component containers, where the first tintable base composition includes: a first resin, a first liquid carrier, and a first pigment package; and the second tintable base composition includes: a second resin, a second liquid carrier, and optionally a second pigment package, where the first pigment package includes a hiding pigment, where the hiding pigment comprises less than 20 weight percent of the first tintable base composition based on total solids of the first tintable base composition.

The present invention is also directed to a coating system, including as separate components: (a) a first tintable base composition including: a first resin, a first liquid carrier, and a first pigment package; and (b) a second tintable base composition including: a second resin, a second liquid carrier, and a second pigment package, where the first pigment package and the second pigment package each include a hiding pigment, where the components (a) and (b) are not mixed together.

DESCRIPTION OF THE INVENTION

Figure 1:
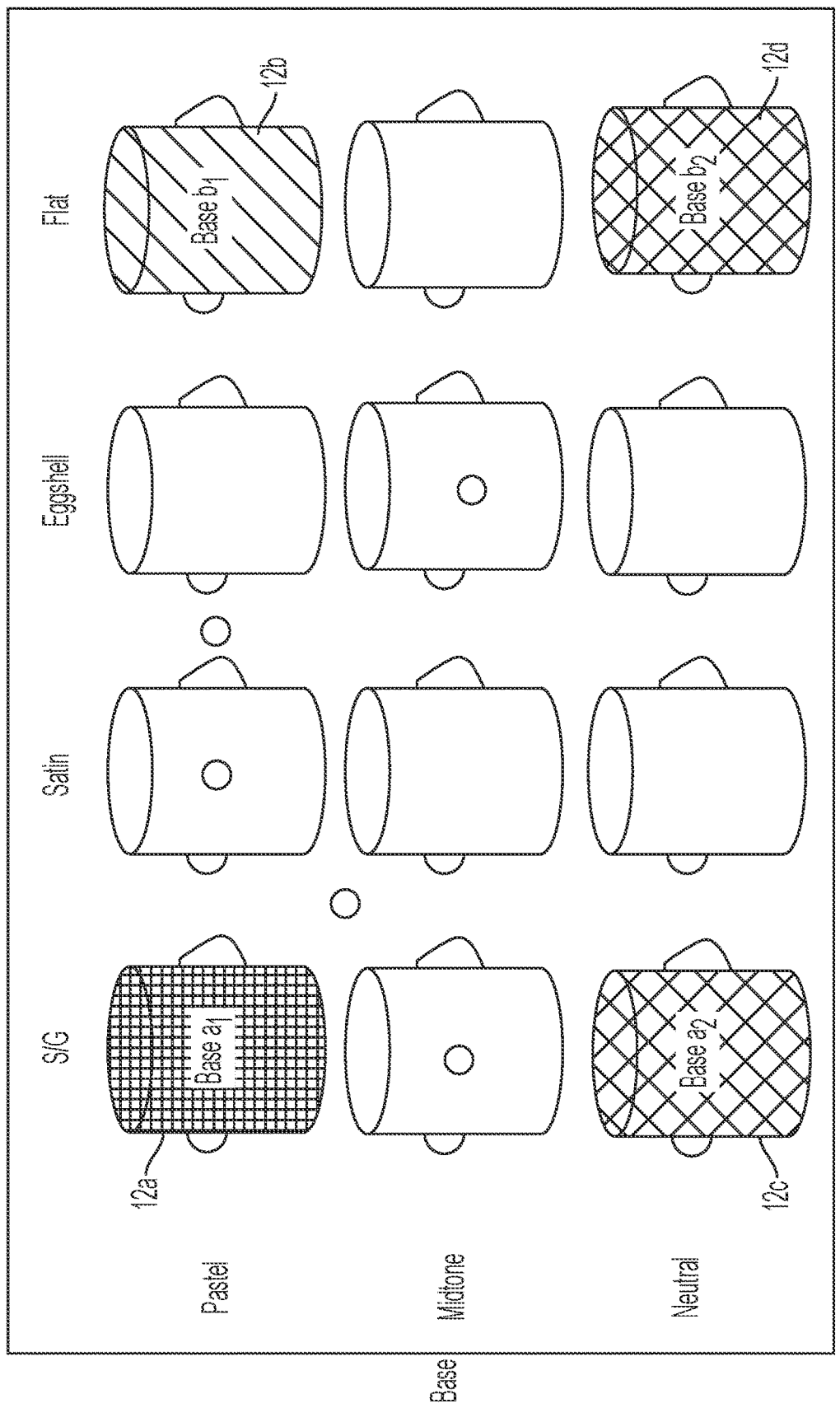
FIG. 1 shows a schematic diagram of a base spectrum for a single tier of tintable base compositions.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses the singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" base, "a" pigment, and the like refer to one or more of any of these items. Also, as used herein, the term "polymer" is meant to refer to prepolymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

As used herein, an "aqueous medium" refers to a liquid medium comprising greater than 50 weight % water, based on the total weight of the liquid medium. Such aqueous liquid mediums can comprise at least 60 weight % water, or at least 70 weight % water, or at least 80 weight % water, or at least 90 weight % water, or at least 95% water, based on the total weight of the liquid medium. The solvents that make up less than 50 weight % of the liquid medium include organic solvents. Non-limiting examples of suitable organic solvents include polar organic solvents e.g. protic organic solvents such as glycols, glycol ether alcohols, alcohols, and volatile ketones, glycol diethers, esters, and diesters. Other non-limiting examples of organic solvents include aromatic and aliphatic hydrocarbons.

As used herein, a "solvent medium" refers to a liquid medium comprising at least 50 weight % solvent, based on the total weight of the liquid medium. Such solvent liquid mediums can comprise at least 60 weight % solvent, or at least 70 weight % solvent, or at least 80 weight % solvent, or at least 90 weight % solvent, or at least 95% solvent based on the total weight of the liquid medium. Water may make up less than 50 weight % of the liquid medium. Non-limiting examples of solvents include polar organic solvents e.g. protic organic solvents such as glycols, glycol ether alcohols, alcohols, and volatile ketones, glycol diethers, esters, diesters, aromatic and aliphatic hydrocarbons.

As used herein, "slurry" refers to a mixture including at least one component dispersed in a liquid carrier. For example, a slurry may include a resin, pigment, extender, filler, or some combination thereof in a liquid carrier. The liquid carrier may be an aqueous medium or a solvent medium.

As used herein, "communication", "communicate", and like terms (except for "fluid communication") may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may be a non-mobile device, such as a desktop computer or kiosk computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices directly or indirectly communicating in the network environment may constitute a "system." As used herein, the term "server" or "processor" may refer to one or more devices that provide a functionality to one or more devices (e.g., one or more client devices) via a network (e.g., a public network, a private network, the Internet, and/or the like). For example, a server may include one or more computing devices. As used herein, the term "system" may refer to one or more devices, such as one or more processors, servers, client devices, computing devices that include software applications, and/or the like. In some non-limiting embodiments or aspects, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Figure 2:
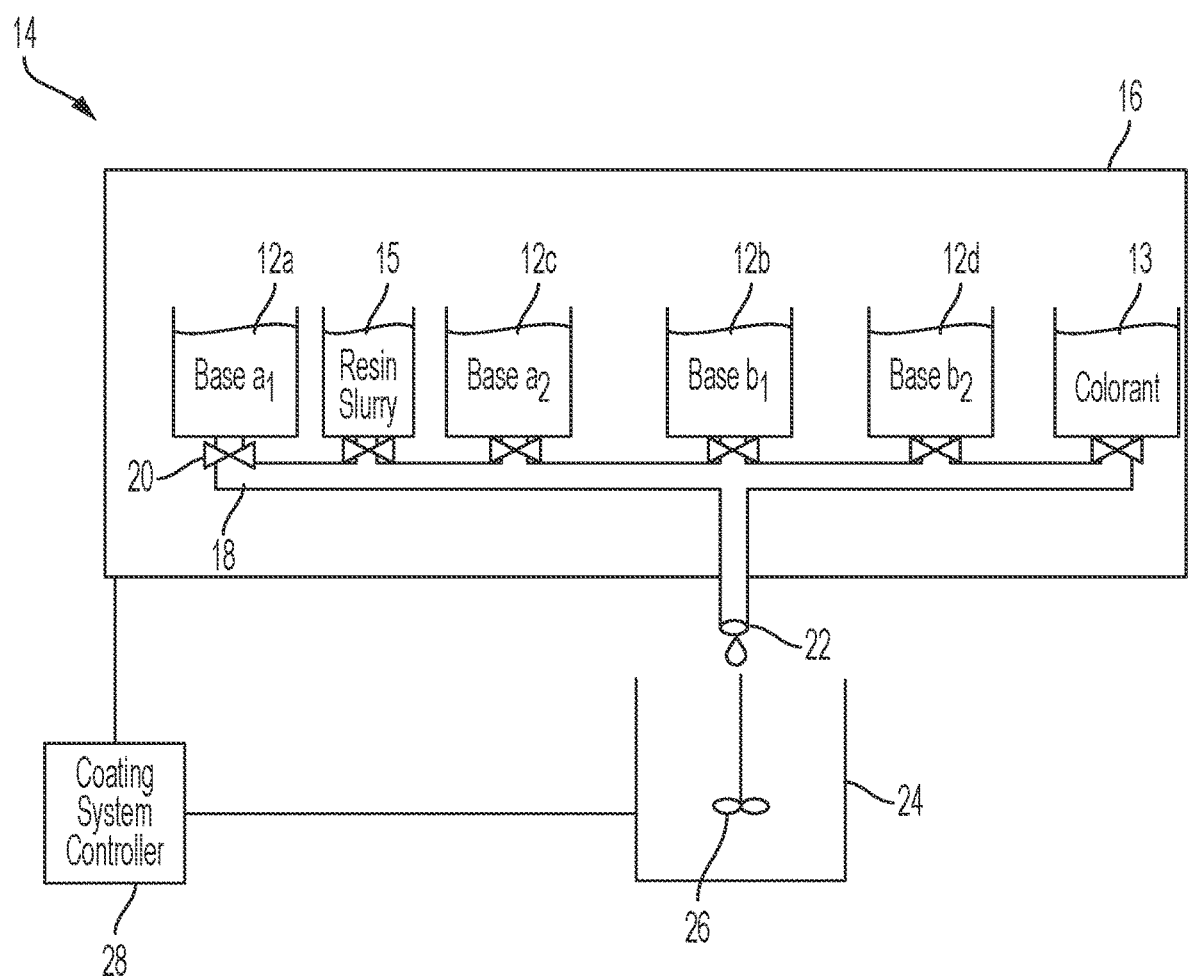
FIG. 2 shows a schematic diagram of a coating system.

Referring to FIGS. 1 and 2, the present invention is directed to a coating system, comprising as separate components: a first tintable base composition comprising: a first resin, a first liquid carrier, and a first pigment package; and a second tintable base composition comprising: a second resin, a second liquid carrier, and optionally a second pigment package, wherein the pigment volume concentration and/or the sheen and/or the gloss of the first tintable base composition and the second tintable base composition are substantially different.

The present invention is also directed to a coating system, comprising as separate components: a first tintable base composition comprising: a first resin, a first liquid carrier, and a first pigment package; and a second tintable base composition comprising: a second resin, a second liquid carrier, and optionally a second pigment package. The first pigment package may include a hiding pigment, and the hiding pigment may include less than 20 weight percent of the first tintable base composition based on total solids of the first tintable base composition. The second pigment package may include a hiding pigment or may be free of a hiding pigment.

The present invention is also directed to a coating system, comprising as separate components: a first tintable base composition comprising: a first resin, a first liquid carrier, and a first pigment package; and a second tintable base composition comprising: a second resin, a second liquid carrier, and a second pigment package. The first pigment package and the second pigment package may each comprise a hiding pigment. The first tintable base composition and the second tintable base composition comprise substantially different amounts of hiding pigment. As used herein, "substantially different amounts of hiding pigment" means that the first tintable base composition includes at least 2 weight %, such as at least 5 weight %, at least 7 weight %, or at least 10 weight % more hiding pigment compared to the second tintable base composition, based on total solids of the tintable base compositions.

FIG. 1 shows a base spectrum for a single tier of tintable base compositions. The base spectrum includes a plurality of bases (e.g., pastel, midtone, neutral) corresponding to a plurality of different sheens (e.g., semi-gloss, satin, eggshell, flat), such that the tier has a plurality of tintable base compositions (corresponding to the various base-sheen combinations).

The pastel bases include the highest weight percent of hiding pigment and may be used as-is for a white paint or tinted to produce very light pastel colors. The midtone bases contain less hiding pigment and are designed for deeper colors and midtones. The neutral bases contain little or no hiding pigment and are designed for deep fully pigmented colors. Thus, the desired color may determine the base selected. The following table shows a range of hiding pigment included the pastel bases, midtone bases, and neutral bases. Ranges of hiding pigment contained in the different bases may overlap due to different tiers of tintable base compositions being available. For example, a higher tier of tintable base composition may have a higher amount of hiding pigment for a particular base compared to a lower tier of tintable base composition for the same particular base, such that a higher tier tintable base composition from one base may overlap with a lower tier tintable base composition from another base in terms of hiding pigment included therein.

| Base System | Hiding Pigment (Weight Percent) |
| --- | --- |
| Neutral | 0-5 |
| Midtone | 5-15 |
| Pastel | 10-20 |

The sheens may include semi-gloss, satin, eggshell, and flat as shown in FIG. 1, but may also include other levels of sheens, such as velvet-like, gloss, high gloss, and the like. The sheens may be defined based on at least one gloss reflectance measurement of the resulting coating as follows, with the measurements for gloss values carried out based on ASTM D523:

| Sheen | 60° Gloss (Gloss) | | 85° Gloss (Sheen) |
| --- | --- | --- | --- |
| Flat/matte | <5 units | and | <10 units |
| Velvet-like | <10 units | and | 10-35 units |
| Eggshell | 10-25 units | and | 10-35 units |
| Satin | 20-35 units | and | >35 units |
| Semi-gloss | 35-70 units | — | — |
| Gloss | 70-85 units | — | — |
| High-gloss | >85 units | — | — |

The sheens may have different levels of pigment volume concentration (PVC). PVC is represented by the following equation:

$$PVC = [V_{pigment}/(V_{pigment} + V_{binder})]*100$$

For example, the following table shows PVC ranges associated with several of the sheens. Ranges of PVC may overlap due to other non-pigment components included in the tintable base composition also contributing the sheen of the coating and/or due to the availability of different tiers of tintable base composition.

| Sheen | Pigment Volume Concentration |
| --- | --- |
| Gloss | 0-15 |
| Semi-gloss | 15-25 |
| Satin | 30-40 |
| Eggshell | 35-45 |
| Flat | 40-80 |

As shown in the base spectrum in FIG. 1, a tintable base composition may be associated with each combination of base-sheen, such that a user can obtain a tintable base composition suitable for preparing a coating composition that has the color and sheen desired (such as by adding colorant to the tintable base composition). The base chosen for the tintable base composition may depend on the color of the coating composition desired by the user. According to the present invention and as shown in FIG. 1, any desired base-sheen combination (tintable base composition) may be obtained by combining a plurality of tintable base compositions without maintaining a tintable base composition for each base-sheen combination. Thus, this plurality of tintable base compositions maintained may be fewer than the number of base-sheen combination options available.

The plurality of tintable base compositions may include at least 2 tintable base compositions that have a substantially different PVC from each other. As used herein, "substantially different PVC" means that the bases have a difference in PVC of at least 2%, such as at least 5%, at least 7%, or at least 10%. The plurality of tintable base compositions may include at least 2 tintable base compositions that have a substantially different gloss (60°) and/or sheen (85°) from each other. As used herein, "substantially gloss or sheen" means that the tintable base compositions have a difference in gloss and/or sheen of at least 2 units, such as at least 5 units, at least 7 units, or at least 10 units. The plurality of tintable base compositions may include at least 2 tintable base compositions that both comprise a hiding pigment (at a same or different level) or may include at least 2 tintable base compositions that are free (contain 0 weight percent) of a hiding pigment. The plurality of tintable base compositions may include a third tintable base composition that (1) when the 2 tintable base compositions both comprise a hiding pigment, the third tintable base composition is free of a hiding pigment; or (2) when the 2 tintable base compositions both are free of a hiding pigment, the third tintable base composition comprises a hiding pigment.

In FIG. 1, the base spectrum includes 3 bases (pastel, midtone, and neutral) and 4 sheens (semi-gloss, satin, eggshell, and flat) (so 12 tintable base compositions), although additional bases and/or sheens may be included in the base spectrum. To achieve any combination of these contemplated base-sheen combinations, four tintable base compositions may be used (although more or fewer could be used in other examples): tintable base composition a1 12a (semi-gloss pastel), tintable base composition b1 12b (flat pastel), tintable base composition a2 12c (semi-gloss neutral), and tintable base composition b2 12d (flat neutral). By combining some amount of these tintable base compositions 12a-12d, any desired base-sheen combination shown in FIG. 1 may be achieved, such as the base-sheen combinations associated with the dots indicated on the base spectrum of FIG. 1. It will be appreciated that by combining these tintable base compositions 12a-12d, levels of base and sheen may be selected to be between even the base-sheen combinations typically available, allowing for higher levels of customization for the user.

Each of the tintable base compositions 12a-12d may include a pre-prepared tintable base composition, such that each includes an already combined resin, liquid carrier, and optional pigment package. The resin, liquid carrier, and pigment package used in these tintable base compositions 12a-12d may be the same or different from one another. The tintable base compositions 12a-12d may be categorized within the same tier of bases as hereinafter described.

The resin may include a resin having acrylic, (meth) acrylic, vinyl, styrene, polyester, epoxy, urethane and/or polysiloxane groups, or combinations thereof. Suitable resins for the resin comprises acrylic resins; alkyd resins; styrene resins; styrene—acrylic resins; vinyl-acrylic resins; vinyl resins; vinyl-acetate resins; ethylene-vinyl acetate (EVA) resins; alkyd—acrylic resins; alkyd—styrene resins; vinyl toluene resins; alkyl substituted styrenes such as alpha-methyl styrene; vinyl acetate-ethylene; styrene-butadiene resins; vinyl toluene-butadiene resins; styrene-acrylonitrile resins; vinyl toluene-acrylonitrile resins; diisocyanate-polyol resins; vinyl alcohol resins; vinyl butyral resins; vinyl chloride resins; and/or vinylidene chloride resins, or some combination thereof.

The liquid carrier may include an aqueous medium and/or a solvent medium.

The tintable base composition may include the pigment package comprising hiding pigment, an extender pigment, and/or a colorant. The tintable base composition may be free of a pigment package. The tintable base compositions may comprise different pigment packages. A different pigment package is a pigment package in which different pigments and/or different amounts of the same pigment are included.

The hiding pigment may include titanium dioxide and/or zinc oxide. The titanium dioxide may include anatase free chalking, rutile medium chalk resistant, and/or rutile highly chalk resistant type, or combinations thereof. Other hiding pigments may be used. As used herein, a "hiding pigment" is a white pigment having a refractive index larger than 1.7. Refractive index, as used herein, may be measured using any suitable test method known to those having ordinary skill in the art, including pigment manufactures as commonly reported thereby on data sheets associated with commercially available pigments. The hiding pigment may be included in the tintable base composition in an amount of from 0 to less than 20 weight percent, such as greater than 0 to less than 20 weight percent, 0 to less than 5 weight percent, greater than 0 to less than 5 weight percent, 5-15 weight percent, or 10-20 weight percent, based on total solids of the tintable base composition. The hiding pigment may be included in the tintable base composition in an amount of less than 20 weight percent, such as less than 15 weight percent, less than 10 weight percent, or less than 5 weight percent, based on total solids of the tintable base composition. The coating system may comprise no separate component having hiding pigment of more than 20 weight percent, or more than 15 weight percent, or more than 10 weight percent, or more than 5 weight percent, based on total solids of the separate component.

The extender pigment may include silicon dioxide or silica, calcium carbonate, kaolin, talc, feldspar, wollastonite, dolomite, mica, nepheline syenite, barite, barium sulfate, blanc fixe, kaolinite, illite, vermiculite, chlorite, magnesium silicate, aluminum silicate, calcium silicate, magnesium alumino-silicate, sodium alumino-silicate, calcium aluminum silicate, sodium potassium aluminosilicate, calcium borosilicate, fumed alumina, alumino hydrate, alumina trihydrate (ATH), or some combination thereof. Other extender pigments may be used. As used herein, an "extender pigment" is an achromatic pigment having a refractive index from 1.45 to 1.7. Consequently, extender pigments do not significantly contribute to the hiding power of the composition. They are used in paint to: reduce cost, achieve durability, alter appearance (e.g., decrease in gloss), control rheology and influence other desirable properties. If used at sufficiently high concentration, an extender may contribute to dry hiding and increase reflectance. Stanley LeSota, et. al., Paint/Coatings Dictionary, Federation of Societies for Coatings Technology, 1978.

The colorant may be the same or different from the hiding pigment and the extender pigment. When used in a composition that also include a hiding pigment and/or an extender pigment, the colorant may be a different pigment therefrom (including a different type of extender or hiding pigment or other type of colorant). The amount of the colorant used can vary depending on the desired color of the composition. As used herein, "colorant" refers to any substance that imparts color and/or other hiding power, opacity and/or other visual effect to the composition. The color imparted may be a non-white color so as to tint the tintable base composition. The colorant may be a dye or pigment, or a concentrated pigment dispersion or paste in water, solvent, or binder. The colorant can be added to a composition in any suitable form, such as discrete particles, dispersions, solutions, and/or flakes. A single colorant or a mixture of 2 or more colorants can be used in the coatings of the present invention.

Referring to FIG. 2, a coating system 14 is shown. The coating system 14 may include a plurality of separate containers each containing one of the previously-described tintable base compositions 12a-12d. These containers may be included in a housing 16. A separate container may contain the colorant 13. A separate container may include a resin slurry 15. The resin slurry 15 may include one of the previously-described resins (the same or different from the resin in the tintable base compositions 12a-12d) in a liquid medium and may be used to alter a property of the composition being formed. A separate container (not shown) may include a crosslinker slurry comprising a crosslinker and a liquid medium, which may be used to alter a property of the composition being formed. The crosslinker may include a hydrazide, a carbodiimide, a silane, or combinations thereof. Thus, each of the components to be eventually combined to form a composition may be separately maintained (not mixed together) in the coating system 14 as shown.

The coating system 14 may include a network of channels 18 configured to flow the various components from the separate containers through an outlet 22 and into a mixing container 24. As such, each of the containers may be in fluid communication with the mixing container 24. Valves 20 may be included in the network of channels 18 to control the flow of the components through the network of channels 18. The mixing container 24 may include a mixer 26, such as a mixing blade, configured to mix the contents of the mixing container 24. The coating system 14 may include a coating system controller 28 programmed or configured to control the components of the coating system 14. The coating system controller 28 may control whether the valves 20 are open or closed, a flow rate of a component flowing into the mixing container 24, the speed of the mixer 26, the duration of mixing, and the like.

With continued reference to FIG. 2, a tintable base composition having a property between the tintable base compositions in the coating system 14 may be prepared in the mixing container 24 by addition of a plurality of the tintable base compositions 12a-12d maintained in separate containers. The tintable base composition may be prepared by mixing the first and second tintable base compositions (e.g., tintable base composition a1 12a and tintable base composition b1 12b, tintable base composition a2 12c and tintable base composition b2 12d, and the like). The tintable base composition may be prepared by mixing at least 2 tintable base compositions having a hiding pigment or 2 tintable base compositions free of a hiding pigment. A third tintable base compositions may be added to the mixing container 24. The third tintable base composition may include: (1) when the 2 tintable base compositions both comprise a hiding pigment, the third tintable base composition is free of a hiding pigment; or (2) when the 2 tintable base compositions both are free of a hiding pigment, the third tintable base composition comprises a hiding pigment. A colorant 13 maintained in a separate container may be added to the mixing container 24 and mixed to form a coating composition. Colorant 13 may already be included in the tintable base compositions 12a-12d. A resin slurry 15 maintained in a separate container may be added to the mixing container 24 and mixed to form a coating composition.

The tintable base composition and/or coating composition (hereinafter "composition") may be prepared by the coating system 14 in a coating store (also referred to herein as a "paint store") or at a coating manufacturing facility.

The composition prepared according the coating system 14 of the present invention may be applied to a substrate by spraying, brushing, roll coating, or some combination thereof.

The composition can be applied to any substrates known in the art, for example, architectural components, such as roofs, bricks, vinyl siding, concrete, cement, cement board, MDF (medium density fiberboard) and particle board, gypsum board, wood, wood composite, veneer, stone, metal, plastics, wall paper and textile, etc., which may be pre-primed by waterborne or solvent borne primers, automotive substrates, marine substrates, industrial substrates, packaging substrates, wood flooring and furniture, apparel, electronics including housings and circuit boards and including consumer electronics such as housings for computers, notebooks, smartphones, tablets, televisions, gaming equipment, computer equipment, computer accessories, MP3 players, glass and transparencies, sports equipment including golf balls, and the like. The architectural component may be an interior wall of a building or residence.

These substrates can be, for example, metallic or non-metallic. Metallic substrates include tin, steel, tin-plated steel, chromium passivated steel, galvanized steel, aluminum, aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, glass, paper, cardboard, textiles, leather both synthetic and natural, and the like.

Accordingly, the present invention is further directed to a substrate coated at least in part with any of the compositions described herein.

Figure 3:
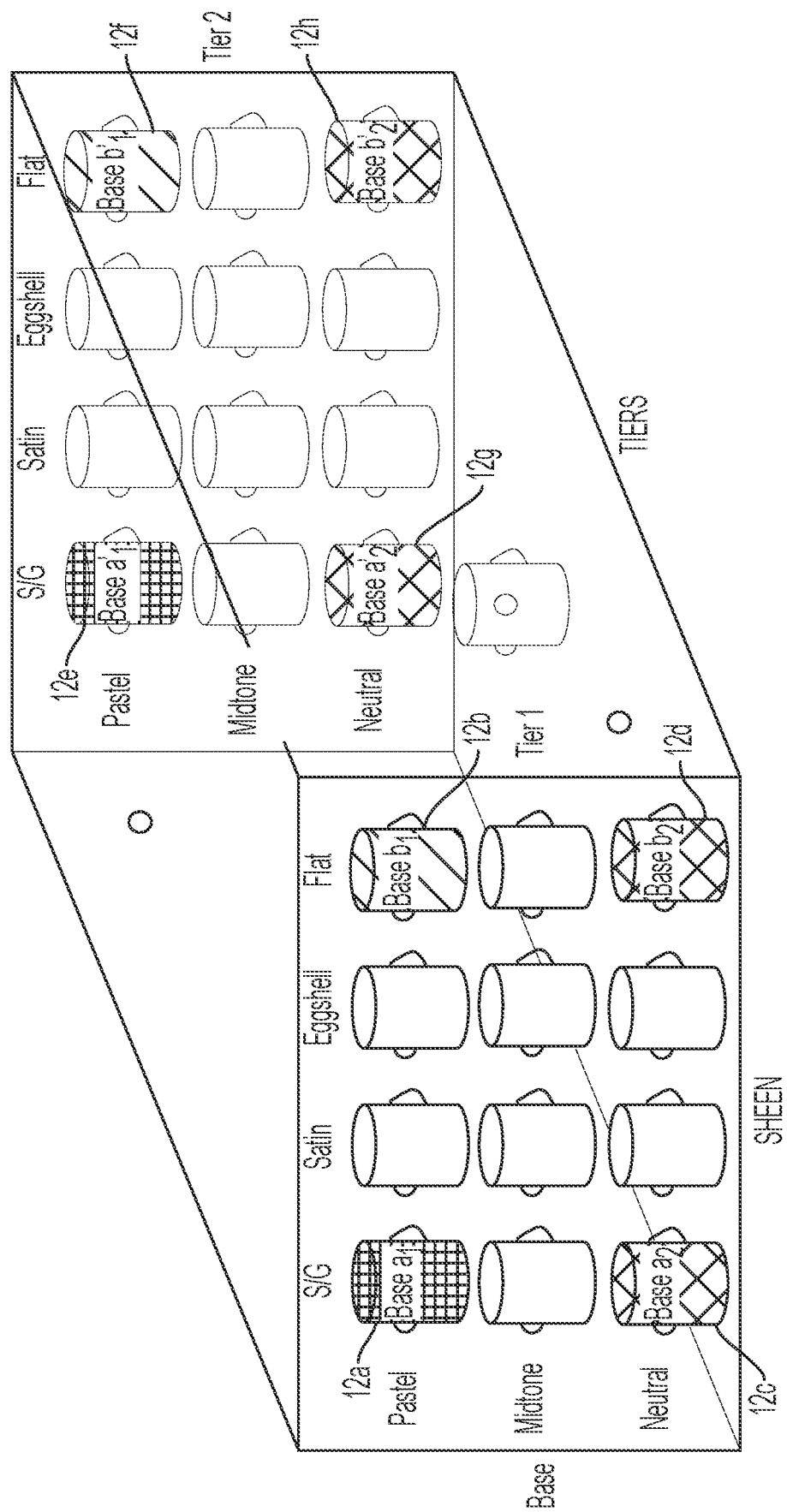
FIG. 3 shows a schematic diagram of a base spectrum for a plurality of tiers of tintable base compositions.
Figure 4:
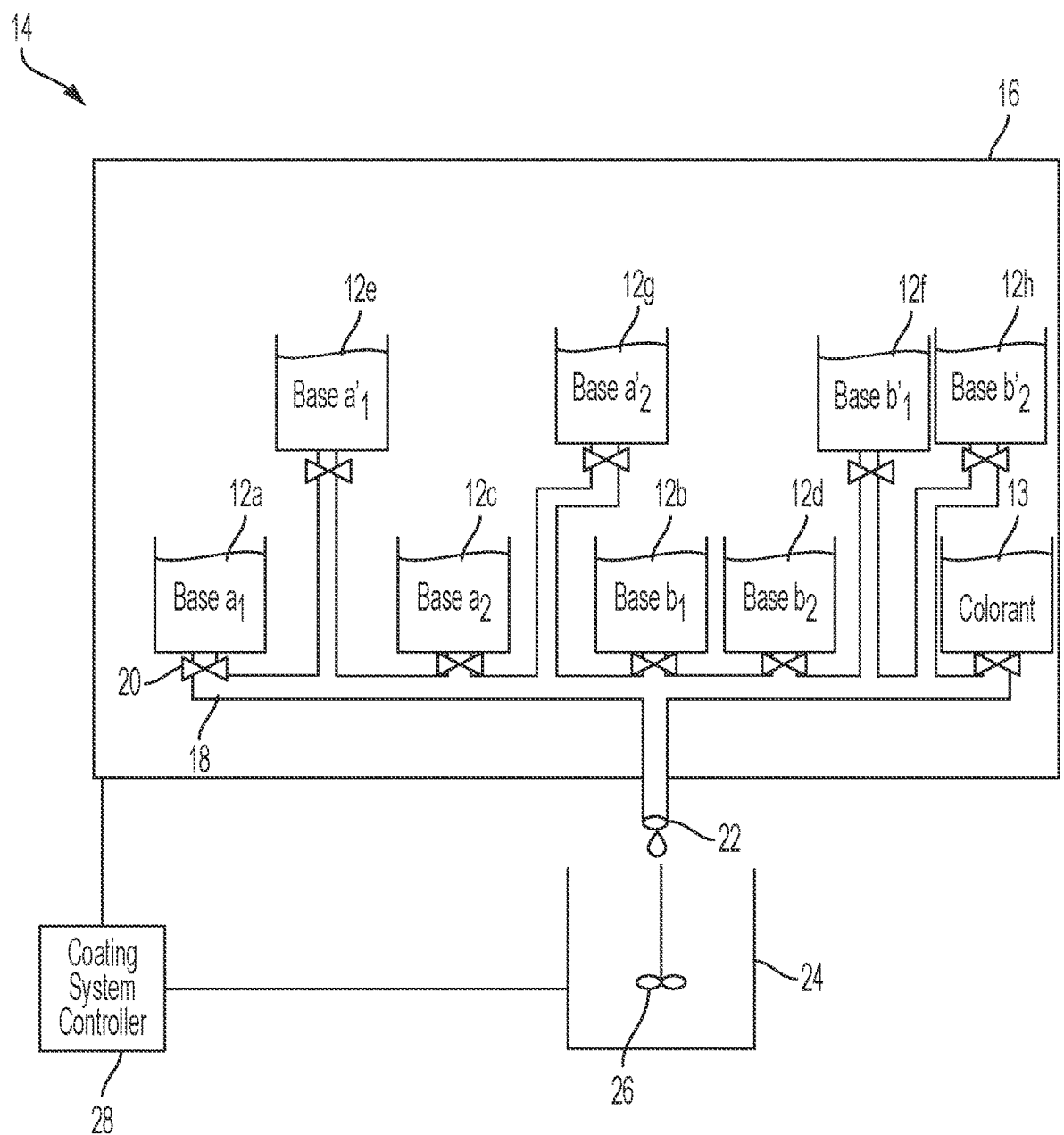
FIG. 4 shows a schematic diagram of a coating system.

Referring to FIGS. 3 and 4, the present invention is directed to a coating system, comprising as separate components: a first tintable base composition comprising: a first resin, a first liquid carrier, and optionally a first hiding pigment; and (b) a second tintable base composition comprising: a second resin, a second liquid carrier, and optionally a second hiding pigment. The first resin and the second resin are different from one another; and/or the first tintable base composition comprises the first hiding pigment and the second tintable base composition comprises the second hiding pigment, wherein the first hiding pigment and the second hiding pigment are different hiding pigments; and/or the first tintable base composition and the second tintable base composition comprise different solids content.

FIG. 3, shows a base spectrum for a plurality of tiers of tintable base compositions. Each tier of the base spectrum includes a plurality of tintable base compositions corresponding to a plurality of different bases and sheens. The first tier of the base spectrum corresponds to the base spectrum shown and described in connection with FIG. 1 and includes tintable base compositions 12a-12d. The second tier of tintable base compositions 12e-12h similarly include a plurality of bases (e.g., pastel bases, midtone bases, and neutral bases) and a plurality of sheens (e.g., semi-gloss, satin, eggshell, and flat).

The second tier tintable base compositions may include a resin, liquid carrier, and pigment package (hiding and/or extender pigments). The second tier tintable base compositions may include a colorant. Any of the previously described resins, liquid carriers, pigments, or colorants may be included in the second tier tintable base compositions.

The first tier tintable base compositions may exhibit a higher quality compared to a second tier of tintable base compositions such that a first tier tintable base composition exhibits an improved property compared to a corresponding second tier tintable base composition. By "corresponding" base, it is meant that the same (within 1%) base and sheen are associated with the first tier tintable base composition and the second tier tintable base compositions; for example, tintable base composition a1 12a from the first tier corresponds to tintable base composition a1' 12e from the second tier, as both bases are pastel-semi-gloss tintable base compositions. The improved property exhibited by the first tier tintable base composition may be any property associated with tintable base compositions, such as the corresponding first tintable base compositions being more white (as measured by $L^*$ according to ASTM E97), having improved scrub resistance (as measured by ASTM D2486), having improved mar and burnish resistance, having improved stain resistance (as measured by ASTM D4828), having improved scuff resistance, being more effective at covering a substrate (as determined according to ASTM D2805), and the like. The first tier and second tier tintable base composition may correspond to two separate lines of base compositions offered by the same manufacturer, but under different tradenames such that one line corresponds to the economy line of base compositions and one line corresponds to the premium line of base compositions from the same manufacturer.

Mar and burnish resistance was measured by drawing down the sample perpendicular to the length of the drawdown on a Leneta P121-10N scrub chart using a 7 mil Dow blade. The film was then allowed to dry in a horizontal position for 7 days. The 85° sheen was measured and noted. A 1000 gram weight was wrapped with Aida Cloth (11 count) and moved back and forth the width of the drawdown for 10 double rubs. The 85° sheen of the rubbed area was read and noted. For flat paints, the 85° sheen unit increase of the rubbed area was compared to the original area and recorded. For satin paints, the % sheen increase was recorded.

The first tier tintable base composition may have any of the above properties that is an at least 10% improvement compared to the same property of the second tier tintable base compositions base.

The first tier tintable base composition may have a higher price per volume (to produce and/or to purchase) as determined by the merchant compared to the corresponding second tier tintable base composition.

The corresponding first tier tintable base composition and the second tier tintable base composition may include any of the previously described resins. The corresponding first tier tintable base composition or the second tier tintable base composition may include a resin different from the other. As used herein, "different resins" are resins formed by reacting different monomers and/or by reacting the same monomers in a different way so as to form a polymer having a different structure. The corresponding first tier tintable base composition may include a resin not included in the second tier tintable base composition, and this resin may be a higher quality resin compared to the resin of the second tier tintable base composition. This higher quality resin may exhibit any of the previously described improved properties exhibited by the first tier tintable base composition compared to the second tier tintable base composition. The resin in the corresponding first tier tintable base composition may include an acrylic polymer, and the resin included in the second tier tintable base composition may include a vinyl acetate polymer. Thus, different tiers of tintable base compositions may include different resins.

The corresponding first tier tintable base composition and second tier tintable base composition may both include the higher quality resin, but the first tier tintable base composition may include the higher quality resin in a substantially higher weight percent (at least 5 weight percent higher) by solids weight of the tintable base composition.

The corresponding first tier tintable base composition may include a higher weight percent of resin by solids weight of the tintable base composition. The weight percent of resin in the first tier tintable base composition may be substantially higher (at least 5 weight percent higher) compared to the second tier tintable base composition.

The corresponding first tier tintable base composition and second tier tintable base composition may both include a hiding pigment, and the first tier tintable base composition or the second tier tintable base composition may include a hiding pigment different from the other. Different hiding pigments refer to hiding pigments prepared from different materials or from the same materials in a different way such that the hiding pigments made from the same materials exhibit a different property. The corresponding first tier tintable base composition may include a higher quality hiding pigment compared to the second tier tintable base composition. The higher quality hiding pigment may exhibit a higher scattering efficiency (have a higher Y-reflectance) as determined by ASTM E97. Thus, different tiers of tintable base compositions may include different hiding pigments.

The corresponding first tier tintable base composition and second tier tintable base composition may both include the higher quality hiding pigment, but the first tier tintable base composition may include the higher quality hiding pigment in a substantially higher amount (at least 5 weight percent higher) by solids weight of the tintable base composition.

The corresponding first tier tintable base composition may include a higher weight percent of hiding pigment by solids weight of the tintable base composition. The weight percent of hiding pigment in the first tier tintable base composition may be substantially higher (at least 5 weight percent higher) compared to the second tier tintable base composition. The corresponding first tier tintable base composition may include a lower weight percent of extender pigment by solids weight of the tintable base composition. The weight percent of extender pigment in the first tier tintable base composition may be substantially lower (at least 5 weight percent lower) compared to the second tier tintable base composition.

The corresponding first tier tintable base composition or the second tier tintable base composition may include a different solids content (e.g., weight percent solids) from each other. The first tier tintable base composition may include a higher solids content compared to the second tier tintable base composition. The first tier tintable base composition may include a substantially higher (at least 5 weight percent higher) solids content compared to the second tier tintable base composition. Thus, different tiers of tintable base compositions may include different solids content Referring to FIG. 4, a coating system 14 is shown that includes the same features of the coating system from FIG. 2 but includes the following additional features. The coating system 14 may include additional separate containers that each contain a second tier tintable base composition 12e-12h. Each of these containers may include a valve 20 and may be in fluid communication with the mixing container 24 via the network of channels 18. By combining some amount of these tintable base compositions 12a-12h, any desired base-sheen combination may be achieved in the first tier, the second tier, and/or some combination thereof (a mid-tier), such as the base-sheen-tier combinations associated with the dots indicated on the base spectrum shown in FIG. 3. It will be appreciated that by combining these tintable base compositions 12a-12h, any level of base and/or sheen and/or tier may be selected to be between even the base-sheen-tier combinations typically available, allowing for higher levels of customization for the user.

With continued reference to FIG. 4, a tintable base composition may be prepared in the mixing container 24 by addition of a plurality of the tintable base compositions 12a-12h maintained in separate containers. At least one of the plurality of tintable base compositions added to the mixing container 24 may be a first tier tintable base composition 12a-12d, and at least one of the plurality of tintable base compositions added to the mixing container 24 may be a second tier tintable base composition 12e-12h, so as to form a mid-tier tintable base composition. A plurality of the first tier tintable base compositions 12a-12d and/or a plurality of the second tier tintable base compositions 12e-12h may be added to the mixing container 24. A colorant 13 maintained in a separate container may be added to the mixing container 24 to form a coating composition. The colorant 13 may already be included in the tintable base compositions 12a-12h.

The tintable base composition and/or coating composition (hereinafter "composition") may be prepared by the coating system 14 in a coating store or at a coating manufacturing facility.

The composition prepared according the coating system 14 of the present invention may be applied to a substrate by spraying, brushing, roll coating, or some combination thereof.

The composition can be applied to any of the previously-described substrates.

Figure 5:
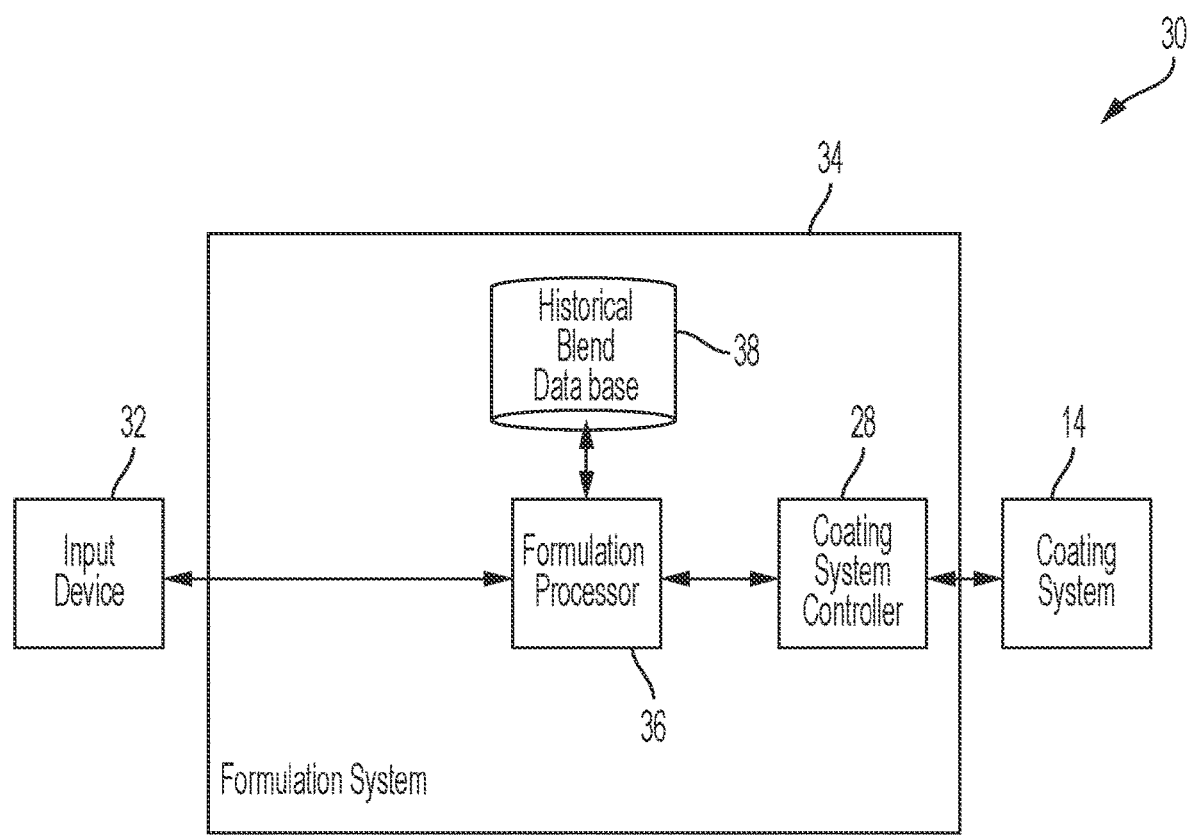
FIG. 5 shows a schematic diagram of a system for determining a formulation for a coating composition.

Referring to FIG. 5, a system 30 is shown for determining a formulation for a coating composition (or a tintable base composition) (hereinafter a "composition"). The system 30 may be used for determining a formulation associated with preparing any of the compositions described in connection with FIGS. 1-4. A formulation may include a relative amount of components to include to form the composition, process steps to form the composition, and/or some combination thereof. For example, referring again to FIGS. 2 and 4, the formulation may include relative amounts of the tintable base compositions 12a-12h, colorant, 13, and/or resin slurry 15 to include in the mixing container 24, a flow rate by which to add these components, a mixing speed for the mixer 26, a mixing time, a temperature at which to mix or maintain, and the like.

With continued reference to FIG. 5, the system 30 may include the coating system 14 as previously described. The system 30 may include an input device 32. The system 30 may include a formulation system 34 in communication with the coating system 14 and the input device 32.

The input device 32 may include a computing device capable of receiving user input and communicating the user input to the formulation system 34. The input device 32 may include a computer associated with a user, such as a desktop computer, laptop computer, tablet computer, smartphone, or the like of the user. The user may input data into the input device 32, such as into an application contained thereon or a webpage loaded thereon, and the input data may be communicated to the formulation system 34. The input device 32 may include a kiosk computer. The kiosk computer may be associated with a paint store and may be located therein.

The user (e.g., a composition consumer) or a merchant (e.g., an associate thereof) may input data into the input device 32 associated with a desired property of an output coating composition. The output coating composition may be a composition the consumer desires to purchase from a coating composition merchant. The desired property may include a tint strength, a gloss, a contrast ratio, a hiding pigment concentration, a colorant concentration, a color, a sheen, a price per volume (or total price), and/or the like. The user may specify one or more desired properties for the output coating composition. The user may specify volume of composition desired.

The tint strength may be determined by the difference in Y-reflectance between the sample and a predetermined standard. The gloss may be determined by ASTM D523. The contrast ratio may be determined by ASTM D2805. The color may be determine by a spectrophotometer or by a predetermined color from a color pallet available from a merchant. The sheen may be determined by ASTM D5233. The price per volume or total price may be specified by a merchant for a particular product or products.

In response to receiving the input, the input device 32 may generate a first message comprising the desired property input to the input device 32. The input device 32 may communicate the first message to the formulation system 34, which may receive the first message.

With continued reference to FIG. 5, the formulation system 34 may include the coating system controller 28 as previously described. The coating system controller 28 of the formulation system 34 may be in communication with the coating system 14. The formulation system 34 may include a formulation processor 36, which may be in communication with the input device 32 and the coating system controller 28. The formulation system 34 may include a historical blend database 38 in communication with the formulation processor 36.

In response to receiving the first message, the formulation processor 36 may generate a formulation for preparing the output coating composition having the desired property specified in the first message. The formulation may be generated based on historical blend data stored in the historical blend database 38, such that the formulation processor 36 communicates with the historical blend database 38 to generate the formulation.

The historical blend data may include experimental data associated with blending a plurality of tintable base compositions (e.g., the tintable base compositions 12a-12e as previously described). The historical blend data may include data associated the above-described desired properties for the resulting blended tintable base compositions produced in the experiments. The desired property from the first message may match with a blended composition from the historical blend data such that the generated formulation matches the formulation for the blended composition from the historical blend data. However, the desired property from the first message may not match with a blended composition from the historical blend data, such that no known existing formula is available for the desired output coating composition. In such cases, the formulation processor 36 may generate a formulation based on the available historical blend data to project a formulation expected to obtain the desired property. This may include applying a machine learning algorithms or other statistical software to generate the unique formulation based on the historical blend data. Additional historical blend data may be added to the historical blend database 38 over time to improve the algorithms for generating the unique formulations.

The formulation processor 36 may generate a formulation for preparing the desired output coating composition having the desired property by determining a property (corresponding to the desired property) associated with a first tintable base composition, determining the property associated with the second tintable base composition, and/or determining the property associated with a blend of the first tintable base composition and the second tintable base composition, or some combination thereof. Based on these determined properties, the formulation processor 36 may determine an amount of the first tintable base composition and the second tintable base composition to combine to form the desired output tintable base composition having the desired property. This process may be performed for any number of tintable base compositions beyond the first and second tintable base compositions, and more than two tintable base compositions may be combined to form the desired output tintable base composition having the desired property.

Figure 6:
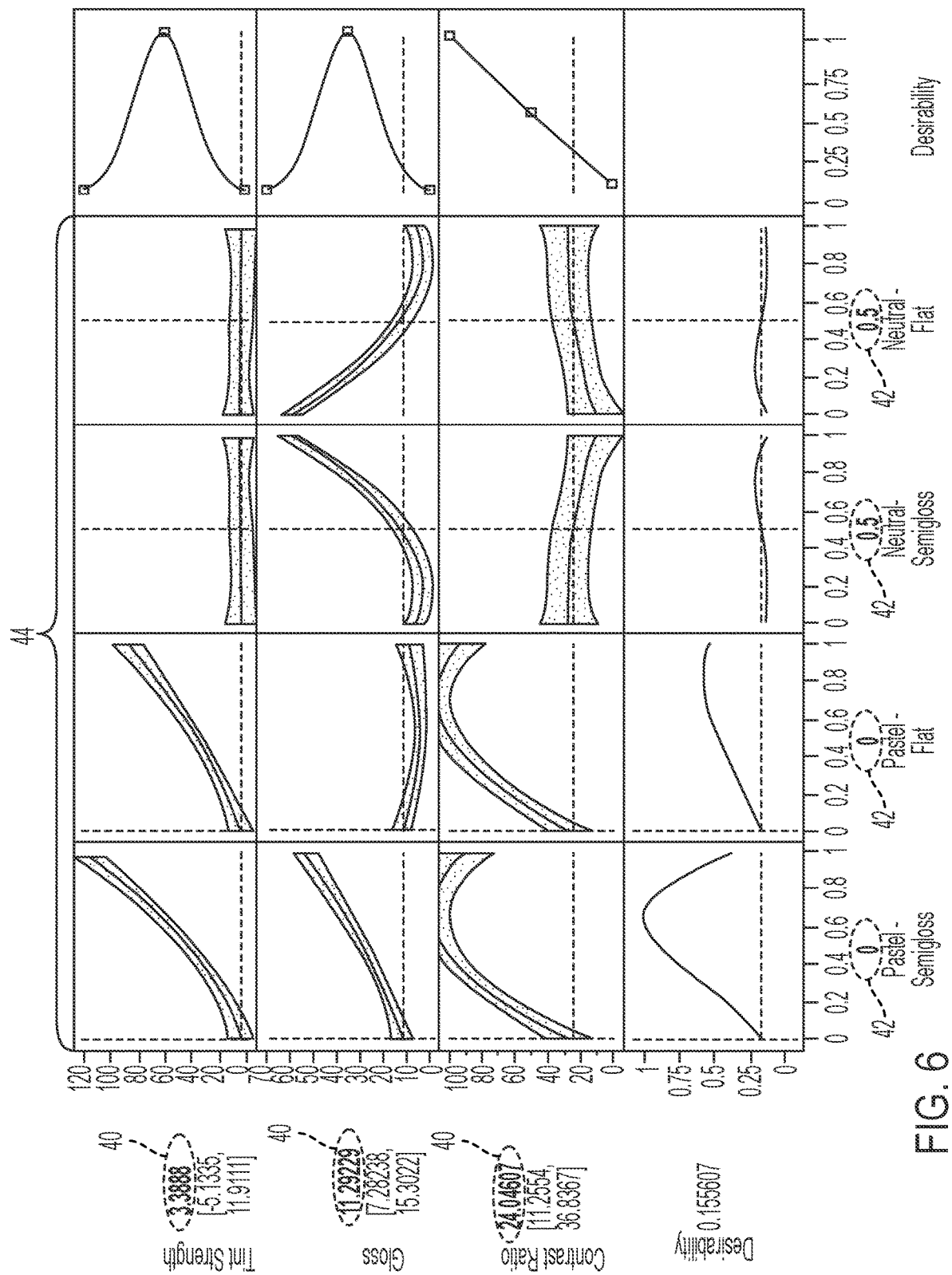
FIG. 6 shows historical blend data.

Referring to FIG. 6, non-limiting historical blend 44 data is shown. The user may input 40 desired properties, such as tint strength, gloss, and contrast ratio as shown in FIG. 6 (and/or any other desired properties as previously described). Based on the input 40, historical blend data 44 may be analyzed to determine the corresponding property associated with a single tintable base composition or a blend of tintable base compositions. This historical blend data 44 may be used to generate the formulation including amounts 42 of tintable base composition(s) to combine to achieve an output coating composition having the properties specified by the input 40. For example, as shown in FIG. 6, for specified desired properties of an input strength of 3.3888, a gloss of 11.29229, and a contrast ratio of 24.04607, the formulation generated (by the formulation processor 36)

includes combining 50 weight percent of the neutral-semi-gloss tintable base composition and 50 weight percent of the neutral-flat tintable base composition. A similar process may be performed for any of the other desired properties previously described that may be specified by the user. The tintable base compositions to be combined according to the formulation may be tintable base compositions of the same tier or may be bases of different tiers (to form a mid-tier base).

The desired property associated with the desired output coating composition may be a property associated with a third tintable base composition. This third tintable base composition may be a current or previously commercially available tintable base composition or an otherwise pre-prepared tintable base composition having an associated formulation. Based on the first message comprising the property associated with the third tintable base composition, the formulation processor 36 may generate a formulation that may be different from the formulation associated with the third tintable base composition. As such, the formulation processor 36 may optimize the formulation associated with the third tintable base composition. Compared to the formulation associated with the third tintable base composition, the optimized formulation may minimize the amount of colorant included in the optimized formulation such that the optimized formulation includes less colorant compared to the formulation associated with the third tintable base composition, and the optimized formulation may have substantially less (at least 5 weight percent based on total solids) colorant compared to the formulation associated with the third tintable base composition. Compared to the formulation associated with the third tintable base composition, the optimized formulation may minimize the amount of hiding pigment included in the optimized formulation such that the optimized formulation includes less hiding pigment compared to the formulation associated with the third tintable base composition, and the optimized formulation may have substantially less (at least 5 weight percent based on total solids) hiding pigment compared to the formulation associated with the third tintable base composition.

Compared to the formulation associated with the third tintable base composition, the optimized formulation may minimize the difference in the contrast ratio of the resulting composition between the optimized formulation and the formulation associated with the third tintable base composition. The contrast ratio of the composition formed from the optimized formulation may have a contrast ratio of at least 98, such as at least 98.5, at least 99, or at least 99.5.

Compared to the formulation associated with the third tintable base composition, the optimized formulation may minimize the difference in $\Delta E$ of the resulting composition between the optimized formulation and the formulation associated with the third tintable base composition. $\Delta E$ may be determined by comparing the reflectance properties of a sample cured coating to a reference cured coating using a spectrophotometer. The composition resulting from the optimized formulation may have a $\Delta E$ of less than 2 or less than 1 compared to the composition resulting from the formulation associated with the third tintable base composition, such that the two compositions appear of identical color to an untrained and/or trained human eye.

Referring again to FIG. 5, in response to determining the formulation, the formulation processor 34 may communicate the formulation to the coating system controller 28 to cause the coating system controller 28 to communicate with the coating system 14. The formulation processor 34 and the coating system controller 28 may be the same or different processors. Moreover, each of the formulation processor 34 and the coating system controller 28 may be a single or multiple processors.

The coating system controller 28 may communicate with the coating system 14 to cause the coating system 14 to prepare the composition associated with the formulation. This may include coating system controller 28 communicating with the coating system 14 to cause the coating system 14 to add the components maintained in separate containers into the mixing container 24 and mix the combined components using the mixer 26 to form the output coating composition according to the formulations. The coating system controller 28 may control the various components of the coating system 24 to cause the output coating composition to be prepared. As such, based on the formulation generated by the formulation system 34, the formulation system 34 may cause the coating system 14 to prepare the composition customized based on the specifications of the user.

At least one component of the coating system 30 may be maintained in a paint store to enable a user to request a customized composition and/or have the customized composition prepared at the paint store. The user may input the desired properties to a kiosk computer (as the input device 32) located at a paint store such that all system 30 components are located at the paint store. The user may input the desired properties to a computer associated with the user (as the input device 32) at a location remote from the paint store, such that the user may input the desired properties remote from the paint store and have the customized composition as determined by the formulation system 34 prepared at the paint store or other facility and may pick up the prepared composition at the paint store or other facility or third party location or have the composition delivered to the user.

Figure 7:
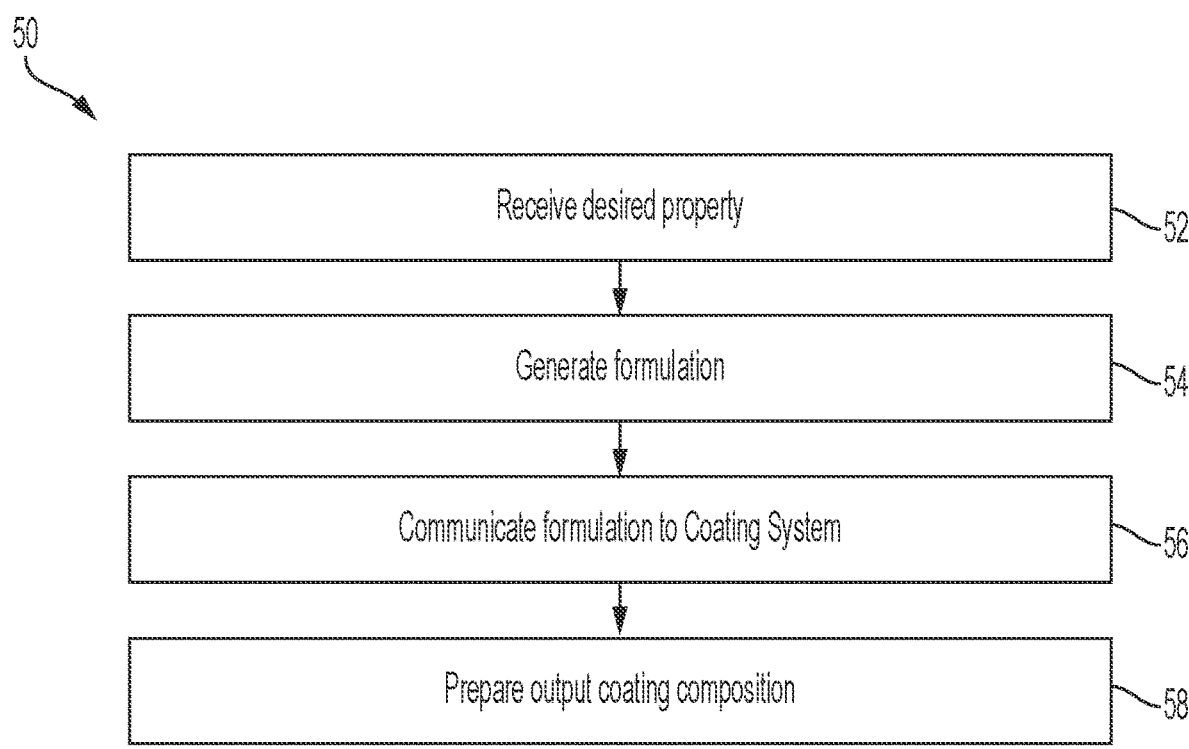
FIG. 7 shows a step diagram of a method for determining a formulation for a coating composition.

Referring to FIG. 7, a computer-implemented method 50 is shown for determining a formulation for a coating composition. At a step 52, the formulation processor 36 may receive the first message from the input device 32, the first message comprising the desired property associated with the desired output coating composition. At a step 54, in response to receiving the first message, the formulation processor 36 may generate the formulation for preparing the desired output coating composition having the desired property based on the historical blend data.

At a step 56, the formulation processor 36 may communicate the formulation to the coating system 14 to cause the coating system 14 to prepare the desired output coating composition according to the formulation. At a step 58, the coating system 14 may prepare the desired output coating composition according to the formulation.

A computer program product for determining a formulation for a coating composition may include at least one non-transitory computer readable medium including program instructions that, when executed by a processor, cause the processor to execute one of the previously-described methods. The processor may include the formulation processor 36 and/or the coating system controller 28.

The present invention further includes the subject matter of the following clauses:

Clause 1: A coating system, comprising as separate components: (a) a first tintable base composition comprising: a first resin, a first liquid carrier, and a first pigment package; and (b) a second tintable base composition comprising: a second resin, a second liquid carrier, and optionally a second pigment package, wherein the pigment volume concentration and/or the sheen and/or the gloss of the first tintable base composition and the second tintable base composition are substantially different, wherein the components (a) and (b) are not mixed together.

Clause 2: The coating system of clause 1, wherein the first tintable base composition and the second tintable base composition: (i) both comprise a hiding pigment; or (ii) both are free of a hiding pigment.

Clause 3: The coating system of clause 2, further comprising a third tintable base composition comprising a third resin, a third liquid carrier, and a third pigment, wherein when the first tintable base composition and the second tintable base composition both comprise a hiding pigment, the third tintable base composition is free of a hiding pigment, wherein when the first tintable base composition and the second tintable base composition both are free of a hiding pigment, the third tintable base composition comprises a hiding pigment, wherein the third tintable base composition (c) is not mixed with components (a) or (b).

Clause 4: The coating system of any of clause 1-3, further comprising a mixing device comprising a plurality of separate component containers comprising a first component container and a second component container, wherein the first component container comprises the first tintable base composition, and wherein the second component container comprises the second tintable base composition.

Clause 5: The coating system of any of clause 1-4, further comprising a colorant and/or a resin slurry comprising a liquid medium and a resin, wherein the colorant and the resin slurry are separate components from the first and second tintable base compositions.

Clause 6: A method of preparing a tintable base composition from a plurality of tintable base compositions, comprising: mixing in a mixing container a plurality of tintable base compositions comprising a first tintable base composition and a second tintable base composition, wherein the plurality of tintable base compositions are provided to the mixing container from separate component containers, wherein the first tintable base composition comprises: a first resin, a first liquid carrier, a first pigment package, wherein the second tintable base composition comprises: a second resin, a second liquid carrier, and optionally a second pigment package, wherein the pigment volume concentration and/or the sheen and/or the gloss of the first tintable base composition and the second tintable base composition are substantially different.

Clause 7: The method of clause 6, wherein the first tintable base composition and the second tintable base composition: (i) both comprise a hiding pigment; or (ii) both are free of a hiding pigment.

Clause 8: The method of clause 7, wherein the plurality of tintable base compositions comprises a third tintable base composition comprising a third resin, a third liquid carrier, and a third pigment, wherein when the first tintable base composition and the second tintable base composition both comprise a hiding pigment, the third tintable base composition is free of a hiding pigment, wherein when the first tintable base composition and the second tintable base composition both are free of a hiding pigment, the third tintable base composition comprises a hiding pigment.

Clause 9: The method of any of clauses 6-8, further comprising: adding a colorant to the mixing container, wherein the colorant is provided from a separate container.

Clause 10: A substrate at least partially coated with a tintable base composition prepared from mixing compositions of the system of any of clauses 1-5 and/or by the method of any of clauses 6-9.

Clause 11: The substrate of clause 10, wherein the substrate comprises an architectural component.

Clause 12: A coating system, comprising as separate components: (a) a first tintable base composition comprising: a first resin, a first liquid carrier, and optionally a first hiding pigment; and (b) a second tintable base composition comprising: a second resin, a second liquid carrier, and optionally a second hiding pigment, wherein the components (a) and (b) are not mixed together, and wherein: (1) the first resin and the second resin are different from one another; and/or (2) the first tintable base composition comprises the first hiding pigment and the second tintable base composition comprises the second hiding pigment, wherein the first hiding pigment and the second hiding pigment are different hiding pigments; and/or (3) the first tintable base composition and the second tintable base composition comprise different solids content.

Clause 13: The coating system of clause 12, wherein the first tintable base composition and the second tintable base composition are categorized by different tiers of coating compositions.

Clause 14: The coating system of clause 13, wherein the first tintable base composition is categorized by a first tier having a first scrub resistance and the second tintable base composition is categorized by a second tier having a second scrub resistance, wherein the first scrub resistance is at least 10% higher than the second scrub resistance.

Clause 15: The coating system of any of clauses 12-14, wherein the first resin comprises an acrylic polymer and the second resin comprises a vinyl acetate polymer.

Clause 16: The coating system of any of clauses 12-15, wherein the first resin imparts a higher stain resistance or burnish resistance compared to the second resin.

Clause 17: The coating system of any of clauses 12-16, wherein the first hiding pigment exhibits a higher scattering efficiency compared to the second hiding pigment.

Clause 18: The coating system of any of clauses 12-17, wherein the first tintable base composition comprises a higher weight percent of hiding pigment, a higher weight percent of resin, and/or a lower weight percent of extender pigment, based on total solids and compared to the second tintable base composition.

Clause 19: A method of preparing a mid-tier tintable base composition from a plurality of tintable base compositions, comprising: mixing in a mixing container a plurality of tintable base compositions comprising a first tintable base composition and a second tintable base composition to form a mid-tier tintable base composition, wherein the plurality of tintable base compositions are provided to the mixing container from separate component containers, wherein the first tintable base composition comprises: a first resin, a first liquid carrier, and optionally a first hiding pigment, wherein the second tintable base composition comprises: a second resin, a second liquid carrier, and optionally a second hiding pigment, and wherein: (1) the first resin and the second resin are different from one another; and/or (2) the first tintable base composition comprises the first hiding pigment and the second tintable base composition comprises the second hiding pigment, wherein the first hiding pigment and the second hiding pigment are different hiding pigments; and/or (3) the first tintable base composition and the second tintable base composition comprise different solids content.

Clause 20: The method of clause 19, wherein the first tintable base composition and the second tintable base composition are characterized by different tiers of coating compositions.

Clause 21: A substrate at least partially coated with a mid-tier tintable base composition prepared from mixing compositions of the system of any of clauses 12-18 and/or by the method of clause 19 or 20.

Clause 22: The substrate of clause 21, wherein the substrate comprises an architectural component.

Clause 23: A computer-implemented method for determining a formulation for a coating composition, comprising: receiving, with a processor, a desired property associated with a desired output coating composition; and generating, with a processor and based on historical blend data, a formulation for preparing the desired output coating composition having the desired property, wherein the historical blend data comprises data associated with blending a plurality of tintable base compositions, wherein the plurality of tintable base compositions comprises a first tintable base composition comprising a first resin, a first liquid carrier, and a first pigment package, and a second tintable base composition comprising a second resin, a second liquid carrier, and optionally a second pigment package.

Clause 24: The computer-implemented method of clause 23, further comprising: communicating, with a processor, the formulation to a mixing device comprising a mixing container and a plurality of separate component containers comprising a first container comprising the first tintable base composition and a second container comprising the second tintable base composition to cause the mixing device to add the first tintable base composition and the second tintable base composition to the mixing container according to the formulation.

Clause 25: The computer-implemented method of clause 23 or 24, wherein the desired property is received from a computing device, wherein the computing device comprises a computing device associated with a user and/or a computing device associated with a paint store.

Clause 26: The computer-implemented method of any of clauses 23-25, wherein the desired property comprises a tint strength, a gloss, a contrast ratio, a hiding pigment concentration, a colorant concentration, a color, a sheen, and/or a price per volume associated with the desired output coating composition.

Clause 27: The computer-implemented method of any of clauses 23-26, wherein generating the formulation for preparing the desired output coating composition having the desired property, comprises: determining, with a processor, a property associated with the first tintable base composition; determining, with a processor, a property associated with the second tintable base composition; determining, with a processor, a property associated with a blend of the first tintable base composition and the second tintable base composition; and based on the property associated with the first and second tintable base compositions, determine, with a processor, the amount of the first and second tintable base compositions to combine to form the desired output tintable base composition having the desired property.

Clause 28: The computer-implemented method of any of clauses 23-27, wherein the desired property associated with a desired output coating composition comprises a property associated with a third tintable base composition further comprising a colorant, wherein generating the formulation comprises: minimizing (i) a colorant amount included in the output coating composition, (ii) a hiding pigment amount included in the output coating composition, (iii) a difference in contrast ratio between the output coating composition and the third tintable base composition further comprising the colorant, and/or (iv) a difference in $\Delta E$ between the output coating composition and the third tintable base composition further comprising the colorant.

Clause 29: The computer-implemented method of clause 28, wherein the contrast ratio of the output coating composition is at least 98 and/or the difference in $\Delta E$ between the output coating composition and the third tintable base composition further comprising the colorant is less than or equal to 2.

Clause 30: A system for determining a coating composition formulation, comprising a processor programmed or configured to: receive a desired property associated with a desired output coating composition; and generate, based on historical blend data, a formulation for preparing the desired output coating composition having the desired property, wherein the historical blend data comprises data associated with blending a plurality of tintable base compositions, wherein the plurality of tintable base compositions comprises a first tintable base composition comprising a first resin, a first liquid carrier, and a first pigment package, and a second tintable base composition comprising a second resin, a second liquid carrier, and optionally a second pigment package.

Clause 31: The system of clause 30, wherein the processor is programmed or configured to: communicate the formulation to a mixing device comprising a mixing container and a plurality of separate component containers comprising a first container comprising the first tintable base composition and a second container comprising the second tintable base composition to cause the mixing device to add the first tintable base composition and the second tintable base composition to the mixing container according to the formulation.

Clause 32: The system of clause 30 or 31, wherein the desired property is received from a computing device, wherein the computing device comprises a computing device associated with a user and/or a computing device associated with a paint store.

Clause 33: The system of any of clauses 30-32, wherein the desired property comprises a tint strength, a gloss, a contrast ratio, a hiding pigment concentration, a colorant concentration, a color, a sheen, and/or a price per volume associated with the desired output coating composition.

Clause 34: The system of any of clauses 30-33, wherein generating the formulation for preparing the desired output coating composition having the desired property comprises the processor: determining a property associated with the first tintable base composition; determining a property associated with the second tintable base composition; determining a property associated with a blend of the first tintable base composition and the second tintable base composition; and based on the property associated with the first and second tintable base compositions, determining the amount of the first and second tintable base compositions to combine to form the desired output tintable base composition having the desired property.

Clause 35: The system of any of clauses 30-34, wherein the desired property associated with a desired output coating composition comprises a property associated with a third tintable base composition further comprising a colorant, wherein generating the formulation comprises: minimizing (i) a colorant amount included in the output coating composition, (ii) a hiding pigment amount included in the output coating composition, (iii) a difference in contrast ratio between the output coating composition and the third tintable base composition further comprising the colorant, and/or (iv) a difference in $\Delta E$ between the output coating composition and the third tintable base composition further comprising the colorant.

Clause 36: The system of clause 35, wherein the contrast ratio of the output coating composition is at least 98 and/or the difference in $\Delta E$ between the output coating composition and the third tintable base composition further comprising the colorant is less than or equal to 2.

Clause 37: A computer program product for determining a coating composition formulation, comprising a non-transitory computer-readable medium including program instructions that, when executed by a processor, cause the processor to: receive a desired property associated with a desired output coating composition; and generate, based on historical blend data, a formulation for preparing the desired output coating composition having the desired property, wherein the historical blend data comprises data associated with blending a plurality of tintable base compositions, wherein the plurality of tintable base compositions comprises a first tintable base composition comprising a first resin, a first liquid carrier, and a first pigment package, and a second tintable base composition comprising a second resin, a second liquid carrier, and optionally a second pigment package.

Clause 38: The computer program product of clause 37, wherein the program instructions cause the processor to: communicate the formulation to a mixing device comprising a mixing container and a plurality of separate component containers comprising a first container comprising the first tintable base composition and a second container comprising the second tintable base composition to cause the mixing device to add the first tintable base composition and the second tintable base composition to the mixing container according to the formulation.

Clause 39: The computer program product of clause 37 or 38, wherein the desired property is received from a computing device, wherein the computing device comprises a computing device associated with a user and/or a computing device associated with a paint store.

Clause 40: The computer program product of any of clauses 37-39, wherein the desired property comprises a tint strength, a gloss, a contrast ratio, a hiding pigment concentration, a colorant concentration, a color, a sheen, and/or a price per volume associated with the desired output coating composition.

Clause 41: The computer program product of any of clauses 37-40, wherein generating the formulation for preparing the desired output coating composition having the desired property comprises the program instructions causing the processor to: determine a property associated with the first tintable base composition; determine a property associated with the second tintable base composition; determine a property associated with a blend of the first tintable base composition and the second tintable base composition; and based on the property associated with the first and second tintable base compositions, determine the amount of the first and second tintable base compositions to combine to form the desired output tintable base composition having the desired property.

Clause 42: The computer program product of any of clauses 37-41, wherein the desired property associated with a desired output coating composition comprises a property associated with a third tintable base composition further comprising a colorant, wherein generating the formulation comprises: minimizing (i) a colorant amount included in the output coating composition, (ii) a hiding pigment amount included in the output coating composition, (iii) a difference in contrast ratio between the output coating composition and the third tintable base composition further comprising the colorant, and/or (iv) a difference in $\Delta E$ between the output coating composition and the third tintable base composition further comprising the colorant.

Clause 43: The computer program product of clause 42, wherein the contrast ratio of the output coating composition is at least 98 and/or the difference in $\Delta E$ between the output coating composition and the third tintable base composition further comprising the colorant is less than or equal to 2.

Clause 44: A coating system, comprising as separate components: (a) a first tintable base composition comprising: a first resin, a first liquid carrier, and a first pigment package; and (b) a second tintable base composition comprising: a second resin, a second liquid carrier, and optionally a second pigment package, wherein the first pigment package comprises a hiding pigment, wherein the hiding pigment comprises less than 20 weight percent of the first tintable base composition based on total solids of the first tintable base composition, wherein the components (a) and (b) are not mixed together.

Clause 45: The coating system of clause 44, wherein the second tintable base composition comprise the second pigment package, wherein the second pigment package comprises a hiding pigment.

Clause 46: The coating system of clause 44 or 45, further comprising a mixing device comprising a plurality of separate component containers comprising a first component container and a second component container, wherein the first component container comprises the first tintable base composition, and wherein the second component container comprises the second tintable base composition.

Clause 47: The coating system of any of clauses 44-46, further comprising a colorant and/or a resin slurry comprising a liquid medium and a resin, wherein the colorant and the resin slurry are separate components from the first and second tintable base compositions.

Clause 48: A method of preparing a tintable base composition from a plurality of tintable base compositions, comprising: mixing in a mixing container a plurality of tintable base compositions comprising a first tintable base composition and a second tintable base composition to form a resulting tintable base composition, wherein the plurality of tintable base compositions are provided to the mixing container from separate component containers, wherein the first tintable base composition comprises: a first resin, a first liquid carrier, and a first pigment package; and the second tintable base composition comprises: a second resin, a second liquid carrier, and optionally a second pigment package, wherein the first pigment package comprises a hiding pigment, wherein the hiding pigment comprises less than 20 weight percent of the first tintable base composition based on total solids of the first tintable base composition.

Clause 49: The method of clause 48, wherein the second tintable base composition comprises the second pigment package, wherein the second pigment package comprises a hiding pigment.

Clause 50: The method of clause 48 or 49, further comprising a mixing device comprising a plurality of separate component containers comprising a first component container and a second component container, wherein the first component container comprises the first tintable base composition, and wherein the second component container comprises the second tintable base composition.

Clause 51: The method of any of clauses 47-49, further comprising a colorant and/or a resin slurry comprising a liquid medium and a resin, wherein the colorant and the resin slurry are separate components from the first and second tintable base compositions.

Clause 52: A substrate at least partially coated with a tintable base composition prepared from mixing compositions of the system of any of clauses 44-47 and/or by the method of any of clauses 48-51.

Clause 53: The substrate of clause 52, wherein the substrate comprises an architectural component.

Clause 54: A coating system, comprising as separate components: (a) a first tintable base composition comprising: a first resin, a first liquid carrier, and a first pigment package; and (b) a second tintable base composition comprising: a second resin, a second liquid carrier, and a second pigment package, wherein the first pigment package and the second pigment package each comprise a hiding pigment, wherein the components (a) and (b) are not mixed together.

Clause 55: The coating system of clause 54, wherein the first tintable base composition and the second tintable base composition comprise substantially different amounts of hiding pigment.

Clause 56: The coating system of clause 54 or 55, further comprising a mixing device comprising a plurality of separate component containers comprising a first component container and a second component container, wherein the first component container comprises the first tintable base composition, and wherein the second component container comprises the second tintable base composition.

Clause 57: The coating system of any of clauses 54-56, further comprising a colorant and/or a resin slurry comprising a liquid medium and a resin, wherein the colorant and the resin slurry are separate components from the first and second tintable base compositions.

Clause 58: The coating system of any of clauses 54-57, wherein at least one of the first tintable base composition and the second tintable base composition comprises less than 20 weight percent, such as up to 15 weight percent, hiding pigment based on total solids of the first tintable base composition.

EXAMPLES

Examples 1-3

50/50 Blends of Flat/Semi-Gloss Tintable Base Compositions

PPG DIAMOND Flat-Pastel, Semi-gloss-Pastel, Flat-Neutral, and Semi-gloss-Neutral tintable base compositions were mixed in varying ratios in order to formulate the remaining eight tintable base compositions in the base spectrum (based on the base spectrum shown in FIG. 1). Initial 50/50 blends of the four corner (from FIG. 1) tintable base compositions were made and evaluated, with results shown in Table 1.

TABLE 1

|  | Example 1 Flat/SG Midtone | Example 2 Flat/SG Neutral | Example 3 Flat/SG Pastel |
| --- | --- | --- | --- |
| Tint Strength | 36.19% | 4.03% | 110.35% |
| 60° Gloss | 3.4 | 2.5 | 13.3 |
| Contrast Ratio | 97.86 | 13.7 | 99.7 |

The data obtained from the 50/50 blends was imported into a statistical software package, and the data was analyzed in order to obtain a baseline determination of the mixture effects. Additional mixtures were prepared and mixture data evaluated to further optimize the model.

Examples 4-6

Early Formulation Results for Single-Tier Model

Table 2 shows early formulation results in which a user specified a desired contrast ratio, 60° gloss, and tint strength (or a range, maximum, or minimum thereof), and the model generated a formulation with weight percent of the four corner tintable base compositions to combine. Table 2 also reports experimentally determined properties for the cured coating prepared from the generated formulation based on the input parameters. In Examples 4-11, the tint strength is reported relative to the flat pastel tintable base composition, although the tint strength could be reported relative to other tintable base compositions.

The user input for Example 4 was a target composition that had a maximum contrast ratio, a maximum tint strength, and a 60° gloss of 15. The user input for Example 5 was a target composition that had a maximum contrast ratio, a minimum gloss, and a tint strength of from 20-80%. The user input for Example 6 was a target composition that had a maximum contrast ratio, a tint strength of from 20-80%, and a 60° gloss of 23.

TABLE 2

| Example | Target | Flat Pastel | Flat Neutral | SG Pastel | SG Neutral | Contrast Ratio | 60° Gloss | Tint Strength |
|---|---|---|---|---|---|---|---|---|
| 4 | Eggshell Pastel | 0.4660 | 0 | 0.5184 | 0.0156 | 98.72 | 13.5 | 117.41% |
| 5 | Flat Midtone | .802 | 0 | 0.097 | 0.1 | 95.91 | 11.5 | 44.59% |
| 6 | Satin Midtone | .183 | 0.016 | 0.179 | 0.622 | 93.84 | 27.8 | 27.64% |

Examples 7-9

Optimized Formulation Results for Single-Tier Model

Table 3 shows formulation results from the model after additional experimental data had been added thereto, so as to further optimize the model. Again, the user specified a desired contrast ratio, 60° gloss, and tint strength (or a range, maximum, or minimum thereof), and the optimized model generated a formulation with weight percent of the four corner tintable base compositions to combine. Table 3 also reports experimentally determined properties for the cured coating prepared from the generated formulation based on the input parameters.

The user input for Example 7 was a target composition that had a maximum contrast ratio, a maximum tint strength, and a 60° gloss of 15. The user input for Example 8 was a target composition that had a maximum contrast ratio, a minimum gloss, and a tint strength of from 20-80%. The user input for Example 9 was a target composition that had a maximum contrast ratio, a tint strength of from 20-80%, and a 60° gloss of 20.

TABLE 3

| Example | Target | Flat Pastel | Flat Neutral | SG Pastel | SG Neutral | Contrast Ratio | 60° Gloss | Tint Strength |
|---|---|---|---|---|---|---|---|---|
| 7 | Eggshell Pastel | 0.534 | 0 | 0.466 | 0 | 98.51 | 12.2 | 109.91% |
| 8 | Flat Midtone | .389 | .611 | 0 | 0 | 90.31 | 2.8 | 28% |
| 9 | Satin Midtone | 0.47 | 0 | 0 | 0.53 | 96.51 | 13.8 | 33.24% |

A comparison of the results in Tables 2 and 3 shows the optimized model being able to generate simpler formulations containing the addition of only two of the corner tintable base compositions.

Example 10

Comparison to Commercial Control

The model was tested by the user specifying the contrast ratio, 60° gloss, 85° gloss, and tint strength for PPG DIAMOND Eggshell-Pastel tintable base composition (see Table 4) to determine how accurate the formulation generated to replicate this commercial tintable base composition would be. The specific inputs to the model for Example 10 were a maximum contrast ratio, a 60° gloss of 15, an 85° gloss of 27, and a tint strength of 100. The results shown in Table 4 indicate the experimentally determined properties for the cured coating prepared from the generated formulation based on the input parameters. The experimentally determined properties closely match the properties of PPG DIAMOND Eggshell-Pastel, indicating a reliable model.

TABLE 4

| | Pounds Per Gallon | Contrast Ratio | 60° Gloss | 85° Gloss | Tint Strength |
|---|---|---|---|---|---|
| PPG Diamond Eggshell Pastel | 10.62-10.92 | >97 | 10-20 | 20-35 | 98.5-103.5 |
| Example 10 | 10.78 | 97.58 | 14.6 | 20.9 | 102.85 |

Example 11

Comparison to Commercial Control

The model was tested by the user specifying 60° gloss and tint strength for PPG DIAMOND Semi-gloss-Midtone tintable base composition (see Table 5) to determine how accurate the formulation generated to replicate this commercial tintable base composition would be. The specific inputs to the model for Example 11 were a 60° gloss of 45 and a tint strength of 33. The results shown in Table 5 indicate the experimentally determined properties for the cured coating prepared from the generated formulation based on the input parameters. The experimentally determined properties closely match the properties of PPG DIAMOND Semi-gloss midtone, indicating a reliable model.

TABLE 5

| | Pounds Per Gallon | 60° Gloss | Tint Strength |
|---|---|---|---|
| PPG Diamond Semi-gloss Midtone | 9.434 | 40-50 | 33% |
| Example 11 | 9.433 | 39.7 | 30.63% |

Examples 12-14

Early Formulation Results for Multi-Tier Model

A multi-tier model was then developed. PPG PARAMOUNT (first tier) and PPG SPEEDHIDE (second tier) tintable base compositions, each in Flat-Pastel, Semi-gloss-Pastel, Flat-Neutral, and Semi-gloss-Neutral, were mixed in varying ratios in order to formulate various mid-tier tintable base compositions (based on the base spectrum shown in FIG. 3).

Table 6 shows early formulation results in which a user specified a desired contrast ratio, 60° gloss, and tint strength, and the model generated a formulation with weight percent of the eight corner tintable base compositions from the two tiers to combine to obtain a tintable base composition having the specified properties. In Examples 12-17, the tint strength is reported relative to the PPG DIAMOND tintable base composition corresponding to the tintable base composition target for that particular example.

Table 6 shows early formulation results in which a user specified a desired contrast ratio, 60° gloss, and tint strength (or a range, maximum, or minimum thereof), and the model generated a formulation with weight percent of the four corner tintable base compositions to combine. Table 6 also reports experimentally determined properties for the cured coating prepared from the generated formulation based on the input parameters.

The user input for Example 12 was a target composition that had a maximum contrast ratio, a maximum tint strength, and a 60° gloss of 20. The user input for Example 13 was a target composition that had an unspecified contrast ratio, a gloss of 30, and a minimum tint strength. The user input for Example 14 was a target composition that had a maximum contrast ratio, a maximum tint strength, and a 60° gloss of 25.

TABLE 6

| | | PARAMOUNT | | | | SPEEDHIDE | | | | | | |
|---|---|---|---|---|---|---|---|---|---|---|---|---|
| Example | Target | Flat Pastel | Flat Neutral | Semi-gloss Pastel | Semi-gloss Neutral | Flat Pastel | Flat Neutral | Semi-gloss Pastel | Semi-gloss Neutral | Contrast Ratio | 60° Gloss | Tint Strength |
| 12 | Eggshell Pastel | 0.108 | 0.038 | 0.563 | 0 | 0.093 | 0.009 | 0.181 | 0.008 | 97.08 | 15.7 | 100.15% |
| 13 | Satin Neutral | 0.017 | 0.175 | 0.011 | 0.514 | 0 | 0.08 | 0.009 | 0.194 | 95.47 | 24.2 | 0.98% |
| 14 | Satin Pastel | 0.167 | 0.053 | 0 | 0.1 | 0.043 | 0 | 0.629 | 0.01 | 97.58 | 20.6 | 67.10% |

Examples 15-17

Optimized Formulation Results for Multi-Tier Model

Table 7 shows formulation results from the model after additional experimental data had been added thereto, so as to optimize the model. Again, the user specified a desired contrast ratio, 60° gloss, and tint strength (or a range, maximum, or minimum thereof), and the optimized model generated a formulation with weight percent of the eight corner tintable base compositions to combine. Table 7 also reports experimentally determined properties for the cured coating prepared from the generated formulation based on the input parameters.

The user input for Example 15 was a target composition that had a maximum contrast ratio, a maximum tint strength, and a 60° gloss of 15. The user input for Example 16 was a target composition that had an unspecified contrast ratio, a gloss of 25, and a minimum tint strength. The user input for Example 17 was a target composition that had a maximum contrast ratio, a maximum tint strength, and a 60° gloss of 25.

TABLE 7

| | | PARAMOUNT | | | | SPEEDHIDE | | | | | | |
|---|---|---|---|---|---|---|---|---|---|---|---|---|
| Example | Target | Flat Pastel | Flat Neutral | Semi-gloss Pastel | Semi-gloss Neutral | Flat Pastel | Flat Neutral | Semi-gloss Pastel | Semi-gloss Neutral | Contrast Ratio | 60° Gloss | Tint Strength |
| 15 | Eggshell Pastel | 0.20 | 0 | 0.42 | 0 | 0.12 | 0 | 0.26 | 0 | 98.72 | 15.7 | 101.83 |
| 16 | Satin Neutral | 0.0302 | 0.2513 | 0.1106 | 0.2714 | 0 | 0 | 0.0352 | 0.3015 | 87.28 | 23.3 | 4.34% |

TABLE 7-continued

| | | PARAMOUNT | | | | SPEEDHIDE | | | | | | |
|---|---|---|---|---|---|---|---|---|---|---|---|---|
| Example | Target | Flat Pastel | Flat Neutral | Semi-gloss Pastel | Semi-gloss Neutral | Flat Pastel | Flat Neutral | Semi-gloss Pastel | Semi-gloss Neutral | Contrast Ratio | 60° Gloss | Tint Strength |
| 17 | Satin Pastel | 0.241 | 0 | 0.67 | 0 | 0 | 0.02 | 0 | 0.07 | 98.37 | 23.5 | 114.88% |

A comparison of the results in Tables 6 and 7 shows the optimized model being able to generate simpler formulations containing the addition of fewer corner tintable base compositions.

Examples 18-21

Color Matching Using the Model

The color matching model is similar to the above-described models except that the hiding pigment and colorant levels are included as variables, allowing the user to predict formulations that will achieve high contrast ratio and accurate color match, while also minimizing the amounts of each needed.

For these examples, coatings formed from mixture predictions were compared to commercial standards (PPG DIAMOND), where both the mixture predictions and standards had colorant added. The colorants used for the example were a mixture of black:magenta:phthalo blue, with the standard ratio of addition being 6:18:18 respectively. For the purposes of these examples, the color ratio of the standard is considered "100%". The model variables included in the design were contrast ratio, overall color difference ($\Delta E$), $TiO_2$ (hiding pigment) levels relative to the standard (e.g., 75% $TiO_2$ indicates that 75% of the $TiO_2$ added to the standard was added to the mixture prediction sample)), and colorant added relative to the standard (e.g., 75% colorant indicates that 75% of the colorant added to the standard was added to the mixture prediction sample). The resulting coating compositions formed from the mixture predictions to match the commercial standards are shown in Table 8 below.

TABLE 8

| | PARAMOUNT | | | | SPEEDHIDE | | | |
|---|---|---|---|---|---|---|---|---|
| Sample | Flat Pastel | Flat Neutral | SG Pastel | SG Neutral | Flat Pastel | Flat Neutral | SG Pastel | SG Neutral |
| 18 | 0.14 | 0.14 | 0 | 0.16 | 0.42 | 0 | 0 | 0.14 |
| 19 | 0 | 0.22 | 0 | 0.1 | 0.17 | 0 | 0.23 | 0.24 |
| 20 | 0.19 | 0.06 | 0 | 0.03 | 0.05 | 0 | 0.58 | 0.07 |
| 21 | 0.1 | 0.03 | 0.17 | 0 | 0 | 0.4 | 0.24 | 0.03 |

A collection of data from the samples is shown in Table 9.

TABLE 9

| Example | Colorant % | Overall Color Diff. $\Delta E$ | Contrast Ratio tinted | DRY $TiO_2$ % |
|---|---|---|---|---|
| 18 | 62 | 1.71 | 99.94 | 91 |
| 19 | 53 | 2.00 | 99.89 | 49 |
| 20 | 63 | 1.26 | 99.80 | 48 |
| 21 | 48 | 0.76 | 99.97 | 41 |

In these examples, a $\Delta E$ is defined as the measure of change in visual perception of two given colors. In other words, $\Delta E$ is how different two colors look, with a lower value indicating less perceptible difference. For the purposes of these examples, the goal was to achieve a $\Delta E$ of less than or equal to 2, which is indicative of color differences that are only perceptible under very close observation, while also reducing colorant and $TiO_2$ levels as much as possible while still retaining hide via contrast ratio measurement. As shown in Table 9, all four samples achieved reduced colorant and $TiO_2$ levels while retaining hide and minimizing perceptible color difference. In several cases $TiO_2$ and colorant levels were reduced by at least 50%.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating blending system for blending a plurality of coating compositions comprising:
   (a) a first tintable base composition comprising: a first resin, a first liquid carrier, and a first pigment package; and
   (b) a second tintable base composition comprising: a second resin, a second liquid carrier, and a second pigment package,
   wherein the pigment volume concentration of the first tintable base composition and the second tintable base composition are substantially different and are both greater than zero;

wherein the components (a) and (b) are maintained in separate containers, each of which is in fluid communication with a mixing container; and wherein a coating composition can be prepared by delivering the desired amount of components (a) and (b) to the mixing container and mixing the components.

2. The coating blending system of claim 1, wherein the first tintable base composition and the second tintable base composition:
(i) both comprise a hiding pigment; or
(ii) both are free of a hiding pigment.

3. The coating blending system of claim 1, further comprising a third tintable base composition comprising a third resin, a third liquid carrier, and a third pigment, and
wherein when the first tintable base composition and the second tintable base composition both comprise a hiding pigment, the third tintable base composition is free of a hiding pigment, or
wherein when the first tintable base composition and the second tintable base composition both are free of a hiding pigment, the third tintable base composition comprises a hiding pigment,
wherein the third tintable base composition (c) is maintained in a container separate from components (a) and (b) and is in fluid communication with the mixing container.

4. The coating blending system of claim 1, further comprising a colorant and/or a resin slurry comprising a liquid medium and a resin, wherein the colorant and the resin slurry are separate components from the first and second tintable base compositions.

5. The coating blending system of claim 1, wherein the first pigment package comprises a hiding pigment, wherein the hiding pigment comprises less than 20 weight percent of the first tintable base composition based on total solids of the first tintable base composition.

6. The coating blending system of claim 1, wherein the second pigment package comprises a hiding pigment.

7. The coating blending system of claim 6, wherein (a) the first resin and the second resin are different from one another; and/or (b) the first hiding pigment and the second hiding pigment are different hiding pigments; and/or (c) the first tintable base composition and the second tintable base composition comprise different solids contents.

8. The coating blending system of claim 7, wherein the first tintable base composition and the second tintable base composition are categorized by different tiers of coating compositions.

9. The coating blending system of claim 8, wherein the first tintable base composition is categorized by a first tier having a first scrub resistance and the second tintable base composition is categorized by a second tier having a second scrub resistance, wherein the first scrub resistance is at least 10% higher than the second scrub resistance.

10. The coating blending system of claim 6, wherein the first hiding pigment exhibits a higher scattering efficiency compared to the second hiding pigment.

11. The coating blending system of claim 6, wherein the first tintable base composition comprises a higher weight percent of hiding pigment, a higher weight percent of resin, and/or a lower weight percent of extender pigment, based on total solids as compared to the second tintable base composition.

12. The coating blending system of claim 1, wherein the first resin comprises an acrylic polymer and the second resin comprises a vinyl acetate polymer.

13. The coating blending system of claim 1, wherein the first resin imparts a higher stain resistance or burnish resistance compared to the second resin.

14. A method of preparing a tintable base composition using the coating blending system of claim 1, comprising adding the desired amount of the first tintable base composition and/or the second tintable base composition to the mixing container and mixing the tintable bases.

* * * * *